(12) United States Patent
Itoh et al.

(10) Patent No.: US 6,416,439 B1
(45) Date of Patent: Jul. 9, 2002

(54) TOROIDAL-TYPE CONTINUOUSLY VARIABLE TRANSMISSION

(75) Inventors: Hiroyuki Itoh; Seiji Higuchi; Nobuo Goto, all of Kanagawa; Masami Tanaka, Gunma; Norihisa Kobayashi, Kanagawa, all of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/543,343

(22) Filed: Apr. 5, 2000

(30) Foreign Application Priority Data

May 14, 1999 (JP) .......................................... 11-134489

(51) Int. Cl.[7] .............................................. F16H 15/38
(52) U.S. Cl. .......................... 476/40; 476/46; 384/558; 384/564
(58) Field of Search .............................. 476/40, 42, 46; 384/558, 564

(56) References Cited

U.S. PATENT DOCUMENTS 4,955,246 A  9/1990  Nakano ........................ 74/200

6,179,744 B1 * 1/2001 Oshidari ...................... 476/46

FOREIGN PATENT DOCUMENTS

| JP | 62-71465 | 5/1987 |
| JP | 1-173552 | 12/1989 |
| JP | 6-2809956 | 10/1994 |
| JP | 11-153203 | 6/1999 |

* cited by examiner

Primary Examiner—Allan D. Herrmann
(74) Attorney, Agent, or Firm—Sughrue Mion, PLLC

(57) ABSTRACT

In a toroidal-type continuously variable transmission, a plurality of trunnions is respectively swingable about a pair of mutually concentric pivot shafts through a plurality of radial needle roller bearings respectively supporting the pivot shafts. Each of the radial needle roller bearings includes: an outer race interposed between an outer peripheral surface of the pivot shaft and an inner peripheral surface of the circular hole of the support plate, the outer race having an outer peripheral surface formed in a spherically convex surface; and a plurality of needle rollers respectively disposed on the inside diameter side of the outer race. The outer race is formed with an inwardly facing flange portion on the inner peripheral surface of the end portion thereof.

2 Claims, 12 Drawing Sheets

TOROIDAL-TYPE CONTINUOUSLY VARIABLE TRANSMISSION

BACKGROUND OF THE INVENTION

1. Field of the Invention

The present invention relates to an improved toroidal-type continuously variable transmission to be used as a transmission for a car and, in particular, to such transmission having a structure which is easy to assemble and is able to sufficiently secure the load capacities of the support portions of trunnions employed therein.

2. Description of the Related Art

It has been studied to use such toroidal-type continuously variable transmission as shown in FIGS. 13 and 14 as a transmission for a car. This toroidal-type continuously variable transmission is a transmission which is called a half-toroidal-type continuously variable transmission. In the half-toroidal-type continuously variable transmission, for example, as disclosed in Japanese Utility Model Unexamined Publication No. 62-71465 of Showa, an input side disk 2 is supported concentrically with an input shaft 1, while an output side disk 4 is fixed to the end portion of an output shaft 3 disposed concentrically with the input shaft 1. In the inside of a casing with the toroidal-type continuously variable transmission stored therein and at the intermediate positions of the input side and output side disks 2 and 4 in the axial direction thereof, there are disposed two trunnions 6, 6. The two trunnions 6, 6 can be swung about their respective pivot shafts 5 and 5 disposed at torsional positions which respectively lie in a direction at right angles (in FIGS. 13 and 14, the front and back direction) to the direction (in FIGS. 13 and 14, the right and left direction) of the input and output shafts 1 and 3 but do not intersect the axes of the input and output shafts 1 and 3.

That is, in the two trunnions 6, 6, the pivot shafts 5, 5 are disposed on the outer surfaces of their respective two end portions in such a manner that they are concentric with each other. Also, the respective base end portions of displacement shafts 7, 7 are supported in the intermediate portions of the two trunnions 6, 6 and, by swinging the two trunnions 6, 6 about their respective pivot shafts 5, 5, the inclination angles of the two displacement shafts 7, 7 can be freely adjusted. On the peripheries of the two displacement shafts 7, 7 supported on their respective trunnions 6, 6, there are supported power rollers 8, 8 in such a manner that they can be freely rotated. And, these power rollers 8, 8 are respectively held by and between the mutually opposing inner surfaces 2a and 4a of the input side and output side disks 2 and 4. The sections of the inner surfaces 2a and 4a are respectively formed in a concave-shaped surface which can be obtained by rotating an arc having the pivot shaft 5 as its center. And, the peripheral surfaces 8a, 8a of the power rollers 8, 8, which are respectively formed in a spherically convex-shaped surface, are in contact with the inner surfaces 2a and 4a.

Between the input shaft 1 and input side disk 2, there is disposed a pressure device 9 of a loading cam type, whereby the input side disk 2 can be elastically pressed toward the output disk 4 by the pressure device 9. The pressure device 9 is composed of a cam plate 10 rotatable together with the input shaft 1 and a plurality of (for example, 4) rollers 12, 12 which are rollably held by a retainer 11. On one side surface (in FIGS. 13 and 14, the right side surface) of the cam plate 10, there is formed a cam surface 13 which extends unevenly in the circumferential direction of the cam plate 10; and, on the outer side surface (in FIGS. 13 and 14, the left side surface) of the input side disk 2, there is also formed a cam surface 14 having a similar shape. And, the plurality of rollers 12, 12 are rotatably supported about their respective axes extending in the radial direction with respect to the center of the input shaft 1.

When the above-structured toroidal-type continuously variable transmission is in use, in case where the cam plate 10 is rotated with the rotation of the input shaft 1, the cam surface 13 presses the plurality of rollers 12, 12 against the cam surface 14 formed on the outer surface of the input side disk 2. As a result of this, the input side disk 2 is pressed against the plurality of power rollers 8, 8 and, at the same time, due to the mutual pressure between the two cam surfaces 13, 14 and the plurality of rollers 12, 12, the input side disk 2 is rotated. And, the rotation of the input side disk 2 is transmitted through the plurality of power rollers 8, 8 to the output side disk 4, so that the output shaft 3 fixed to the output side disk 4 can be rotated.

When changing a rotation speed ratio (change gear ratio) between the input shaft 1 and output shaft 3, at first, in case where deceleration is carried out between the input shaft 1 and output shaft 3, the trunnions 6 and 6 are swung about their respective pivot shafts 5 and 5 in a given direction. The displacement shafts 7 and 7 are respectively inclined in such a manner that the peripheral surfaces 8a, 8a of the power rollers 8, 8 are, as shown in FIG. 13, respectively contacted with the near-to-center portion of the inner surface 2a of the input side disk 2 and with the near-to-outer-periphery portion of the inner surface 4a of the outside disk 4 (Here, "near-to-A portion" means a portion which is located near to A). Contrary to the above, in case where acceleration is carried out, the trunnions 6, 6 are swung about their respective pivot shaft 5, 5 in the opposite direction to the above-mentioned given direction. And, the displacement shafts 7, 7 are respectively inclined in such a manner that the peripheral surfaces 8a, 8a of the power rollers 8, 8 are, as shown in FIG. 14, respectively contacted with the near-to-outer-periphery portion of the inner surface 2a of the input side disk 2 and with the near-to-center portion of the inner surface 4a of the outside disk 4. Also, in case where the inclination angles of the displacement shafts 7, 7 are respectively set in the middle of the angles shown FIGS. 13 and 14, a middle change gear ratio can be obtained.

Now, FIGS. 15 and 16 show a more specific version of a toroidal-type continuously variable transmission which is disclosed in Japanese Utility Model Unexamined Publication No. 1-173552 of Heisei. An input side disk 2 and an output side disk 4 are rotatably supported on the periphery of a tubular input shaft 15 respectively through needle roller bearings 16, 16. Also, a cam plate 10 is spline engaged with the outer peripheral surface of the end portion (in FIG. 15, left end portion) of the input shaft 15, while a flange portion 17 prevents the cam plate 10 from moving in a direction where it goes away from the input side disk 2. And, this cam plate 10 cooperates together with a plurality of rollers 12, 12, so as to form a pressure device 9 which, based on the rotation of the input shaft 15, can rotate the input side disk 2 while pressing the input side disk 2 toward the output side disk 4. To the output side disk 4, there is coupled an output gear 18 by keys 19, 19, so that the output side disk 4 and output gear 18 can be rotated synchronously.

The pivot shafts 5, 5, which are disposed in the respective two end portions of the pair of trunnions 6 and 6, are respectively supported on a pair of support plates 20 and 20 in such a manner that they can be freely swung and shifted in their respective axial direction (that is, in FIG. 15, in the front and back direction; and, in FIG. 16, in the right and left direction). In other words, the pair of support plates 20 and 20 are disposed almost in parallel to each other within a housing 21 storing the main body portion of a toroidal-type continuously variable transmission in such a manner that they hold the input side and output side disks 2 and 4 from both sides thereof. Further, the pair of support plates 20 and 20 are also allowed to shift slightly with their respective support posts 45a and 45b as the centers thereof. And, the pivot shafts 5, 5, which are disposed in the two end portions of the pair of trunnions 6 and 6, are respectively supported in the inside portions of circular holes 22, 22 formed in the mutually matched portions of the two support plates 20 and 20 by radial needle roller bearings 23, 23 in such a manner that the pivot shafts 5 and 5 can be freely swung and shifted in the axial direction thereof. The respective circular holes 22, 22 as well as the respective pivot shafts 5, 5 are situated at torsional positions which not only lie in a direction at right angles (in FIG. 15, in the front and back direction; and, in FIG. 16, in the right and left direction) to the direction of the axes of the two disks 2 and 4 (in FIG. 15, in the right and left direction; and, in FIG. 16, in the front and back direction) but also do not intersect the axes of the two disk 2 and 4. Also, each of the radial needle roller bearings 23, 23 is composed of an outer race 24 and a plurality of needle rollers 25, 25. Each outer race 24 is structured such that its outer peripheral surface is formed in a spherically convex-shaped surface and its inner peripheral surface is formed as a cylindrical-surface-shaped outer race raceway. Also, the needle rollers 25, 25 of each radial needle roller bearings 23, 23 are rollably held by a retainer 26. By the way, the reason why the outer peripheral surface of the outer race 24 is formed in a spherical surface is to prevent any edge load from being applied into between the rolling surfaces of the needle rollers 25, 25 and their mating raceways, even when the support plates 20 and 20 are shifted with their respective support posts 45a and 45b as their respective centers to thereby deform the trunnions 6, 6 elastically and also the trunnions 6, 6 are shifted in change gear, so that the center axes of the circular holes 22, 22 are not coincident with the center axes of the pivot shafts 5, 5.

In this manner, in the respective intermediate portions of the trunnions 6, 6 with their respective two end portions supported on their respective support plate 20, 20, there are formed circular holes 27 and 27. And, in these circular holes 27 and 27 portions of the trunnions 6 and 6, there are supported their respective displacement shafts 7 and 7. These displacement shafts 7 and 7 respectively include support shaft portions 28 and 28 as well as pivotal support shaft portions 29 and 29 which are arranged in parallel to each other but are displaced in the axes thereof from each other of these portions, the support shaft portions 28 and 28 are rotatably supported inwardly of their respective circular holes 27 and 27 through another radial needle roller bearings 30, 30. Also, on the peripheries of the pivotal support shaft portions 29, 29, there are rotatably supported power rollers 8, 8 through still another radial needle roller bearings 31, 31.

By the way, the pair of displacement shafts 7 and 7 are disposed at positions 180° opposite to the input shaft 15. And, a direction, in which the pivotal support shaft portions 29 and 29 of the two displacement shafts 7 and 7 are offset from their respective support portions 28 and 28, is the same direction (in FIG. 16, in the reversed right and left direction) with respect to the rotation direction of the two input side and output side disks 2 and 4. Also, such offset direction is set as a direction which intersects almost at right angles to a direction in which the input shaft 15 is disposed.

Therefore, the power rollers 8, 8 are supported in such a manner that they are free to shift slightly in the axial direction of the input shaft 15 (in FIG. 15, in the right and left direction; and, in FIG. 16, in the front and back direction). As a result of this, even in case where the power rollers 8, 8 are caused to shift in the axial direction of the input shaft 15 because these components are elastically deformed by large loads applied thereto according to the transmitting state of the rotational force, such shift can be absorbed without applying an excessive force to the respective components.

Also, between the outer surfaces of the power rollers 8, 8 and the inner surfaces of the intermediate portions of the trunnions 6, 6, there are interposed thrust ball bearings 32, 32 and thrust needle roller bearings 33, 33 in this order from the outer surfaces sides of the power rollers 8, 8. Of these bearings, the thrust ball bearings 32, 32 are bearings which, while receiving thrust-direction loads applied to the power rollers 8, 8, allow these power rollers 8, 8 to rotate. Also, the thrust needle roller bearings 33, 33 are bearings which, while receiving thrust loads applied from the power rollers 8, 8 to outer races 34, 34 forming their respective thrust ball bearings 32, 32, allow the pivotal support shaft portions 29, 29 and the outer races 34, 34 to swing about the support shaft portions 28, 28.

Further, to the respective one-end portions (in FIG. 16, the left end portions) of the trunnions 6, 6, there are coupled drive rods 35, 35 respectively and, to the outer peripheral surfaces of the intermediate portions of the drive rods 35, 35, there are fixedly secured drive pistons 36, 36 respectively. And, the pistons 36, 36 are respectively fitted into the drive cylinders 37, 37 in an oil tight manner.

In the above-structured toroidal-type continuously variable transmission, the rotation of the input shaft 15 is transmitted through the pressure device 9 to the input side disk 2. And, the rotation of the input side disk 2 is transmitted through the pair of power rollers 8, 8 to the output side disk 4 and further the rotation of the output side disk 4 is taken out by the output gear 18. To change a rotation speed ratio between the input shaft 15 and output gear 18, the pair of drive pistons 36, 36 may be shifted in the mutually opposite directions. With such shift of the drive pistons 36, 36, the pair of trunnions 6, 6 are respectively shifted in the mutually opposite directions, so that, for example, the power roller 8 shown on the lower side in FIG. 16 is shifted to the right in FIG. 16, whereas the power roller 8 shown on the upper side in FIG. 16 is shifted to the left in FIG. 16. This changes the direction of tangential-direction forces which respectively act on the contact portions between the peripheral surfaces 8a, 8a of the power rollers 8, 8 and the inner surfaces 2a, 4a of the input side and output side disks 2, 4. With such changes of the tangential-direction forces, the trunnions 6, 6 are swung in the mutually opposite directions about their respective pivot shafts 5, 5 pivotally supported on the support plates 20, 20. As a result of this, as shown in FIGS. 13 and 14, the contact positions between the peripheral surfaces 8a, 8a of the power rollers 8, 8 and the inner surfaces 2a, 4a of the input side and output side disks 2, 4 are changed, which in turn changes the rotation speed ratio between the input shaft 15 and output gear 18.

By the way, when the rotation force is transmitted between the input shaft 15 and output gear 18 in this manner, due to the elastic deformation of the respective components, the power rollers 8, 8 are shifted in the axial direction of the input shaft 15, so that the displacement shafts 7, 7 pivotally supporting these power rollers 8, 8 are rotated slightly about their respective support shaft portions 28, 28. As a result of this rotation, the outer surfaces of the outer races 34, 34 of the thrust ball bearings 32, 32 and the inner surfaces of the trunnions 6, 6 are shifted with respect to each other. Because the thrust needle roller bearings 33, 33 are present between these outer surfaces and inner surfaces, forces necessary to cause such relative shifts are small. Therefore, there are required only small forces to change the inclination angles of the displacement shafts 7, 7 in the above-mentioned manner.

Also, in some cases, the center axes of the pivot shafts 5, 5 and the center axes of the circular holes 22, 22 can be shifted from each other to a slight extent. Even in such cases, the outer races 24, 24 forming the radial needle roller bearings 23, 23 are swung and shifted to thereby be able to prevent the center axes of the outer races 24, 24 and the center axes of the pivot shafts 5, 5 from shifting from each other, which allows the trunnions 6, 6 to swing and shift smoothly about their respective pivot shafts 5, 5. Also, even in a case where the center axes of the circular holes 22, 22 and the center axes of the pivot shafts 5, 5 are not coincident with each other, the outer peripheral surfaces of the outer races 24, 24 can be prevented from strongly contacted with the inner surfaces of the circular holes 22, 22, which allows the smooth shift of the trunnions 6, 6 in the axial direction of the pivot shafts 5, 5.

By the way, as the structure for supporting the pivot shafts 5, 5 on their respective support plates 20, 20 in such a manner that the pivot shafts 5, 5 can be freely swung and shifted in the axial direction thereof, conventionally, there is also known a structure which, as shown in FIG. 17, uses radial needle roller bearings 23a, 23a of a full complement needle roller bearing that the retainers 26 (FIG. 16) are not provided but the number of needle rollers 25, 25 is increased.

As shown in FIG. 16, when the radial needle roller bearings 23, 23 each including the retainer 26 are used to support the pivot shafts 5, 5 on the support plates 20, 20 in such a manner that the pivot shafts 5, 5 can be swung and can be freely shifted in the axial direction thereof, there is a possibility that the load capacities of the needle roller bearings 23, 23 can be insufficient. That is, when the toroidal-type continuously variable transmission of a half-toroidal type is in operation, large thrust loads are applied to the power rollers 8, 8 from the input side and output side disks 2, 4. And, these thrust loads are applied as radial loads to the radial needle roller bearings 23, 23 through the thrust ball bearings 32, 32, thrust needle roller bearings 33, 33, and trunnions 6, 6. The radial loads applied to the radial needle roller bearings 23, 23 can vary according to the output of the engine and, in case of a transmission for a car having a displacement volume of 2 to 3 liters, the radial loads can be about 2 tons.

To secure the load capacities of the radial needle roller bearings 23, 23 sufficient to receive such large radial loads, it is necessary to increase the number of the needle rollers 25, 25 forming the radial needle roller bearings 23, 23 (without reducing the diameters of the needle rollers 25, 25). However, in case where the retainers 26 are incorporated into the radial needle roller bearings 23, 23, the number of the needle rollers 25, 25 cannot be increased unless the diameters of the radial needle roller bearings 23, 23 are increased.

On the other hand, in case of such radial needle roller bearings 23a, 23a of a full complement needle roller bearing as shown in FIG. 17, the number of the needle rollers 25, 25 can be increased to thereby secure the load capacities of the radial needle roller bearings 23a, 23a without increasing the diameters of the radial needle roller bearings 23a, 23a.

However, in case of the conventional structure as shown in FIG. 17, not only the assembling operation thereof is complicated but also it is difficult to secure the durability of members which adjoin the radial needle roller bearings 23a, 23a.

That is, in case of the radial needle roller bearings 23a, 23a of the full complement needle roller bearing as shown in FIG. 17, in a state that the plurality of needle roller 25, 25 are disposed inside of the outer races 24, these needle rollers 25, 25 cannot be positioned in the axial direction thereof. Specifically, while a plurality of needle rollers 25, 25 remain disposed on the inside diameter side of the outer races 24, the outer races 24 and needle rollers 25, 25 cannot be fitted around the pivot shafts 5, 5. For this reason, to assemble the radial needle roller bearings 23a, 23a to the peripheries of the pivot shafts 5, 5, the outer races 24, 24 are firstly disposed in the peripheries of the pivot shafts 5, 5 and, after then, the needle rollers 25, 25 must be inserted one by one into between the inner peripheral surfaces of the outer races 24, 24 and the outer peripheral surfaces of the pivot shafts 5, 5. Such operation is very troublesome; that is, such troublesome operation, unfavorably, hinders the enhancement in the efficiency of the toroidal-type continuously variable transmission assembling operation, thereby causing an increase in the cost of the present transmission.

Also, in order to prevent the needle rollers 25, 25 from shifting in the axial direction thereof (in FIG. 17, in the right and left direction), the needle rollers 25, 25 are held on the outer peripheral surfaces of the trunnions 6, 6 by and between stepped portions 38, 38, which are respectively formed in the base end portions of the pivot shafts 5, 5, and annular hold rings 39, 39 secured to the leading end portions of the pivot shafts 5, 5, or pulleys 43, 43, which are respectively fitted around and fixed to the pivot shafts 5, 5 so as to suspend a cable for synchronizing the swinging movements of the trunnions 6, 6 with each other. Therefore, when the toroidal-type continuously variable transmission is in operation, it is inevitable that the axial-direction end faces of the needle rollers 25, 25 rub against the stepped portions 38, 38 as well as the hold rings 39, 39. However, since the trunnions 6, 6, hold rings 39, 39 and pulleys 43, 43 are formed of material softer than the material of the needle rollers 25, 25, as the toroidal-type continuously variable transmission is used for a long period of time, there is a possibility that the stepped portions 38, 38, hold rings 39, 39 as well as the pulleys 43, 43 can be worn. Such wear is also undesirable, because it gives rise to the deteriorated durability of the toroidal-type continuously variable transmission. Especially, when there is employed a full complement needle roller bearing structure, the needle rollers 25, 25 can be easily skewed. In case where the needle rollers 25, 25 are skewed, there is a fear that the end faces of the needle rollers 25, 25 butt against the hold rings 39, 39 and pulleys 43, 43 to thereby increase the above-mentioned wear.

SUMMARY OF THE INVENTION

The present invention aims at eliminating the drawbacks found in the above mentioned conventional toroidal-type continuously variable transmissions. Accordingly, it is an object of the invention provide a toroidal-type continuously variable transmission which can solve all of the problems found in the conventional toroidal-type continuously variable transmissions.

To attain the above object, there is provided a toroidal-type continuously variable transmission including: a housing; input side and output side disks respectively supported within the housing in such a manner as to be concentric with each other and be rotated independently of each other, the two disks respectively including inner surfaces each formed in a concave surface having an arc-shaped section; a pair of support plates disposed substantially in parallel to each other within the housing in such a manner as to hold the two disks from both sides thereof, the pair of support plates respectively including circular holes formed in the mutually matched portions thereof; a plurality of trunnions being respectively swingable about a pair of mutually concentric pivot shafts, the pivot shafts being respectively disposed at torsional positions lying at right angles to the direction of the center axes of the two disks and not intersecting the center axes; a plurality of displacement shafts respectively supported on the trunnions; a plurality of power rollers respectively supported rotatably on said displacement shafts and held between the respective inner surfaces of the input side and output side disks, each of the power rollers having a peripheral surface formed in a spherically convex surface; and a plurality of radial needle roller bearings respectively supporting the pivot shafts. Each of the radial needle roller bearings includes: an outer race interposed between an outer peripheral surface of the pivot shaft and an inner peripheral surface of the circular hole of the support plate, the outer race having an outer peripheral surface formed in a spherically convex surface; and a plurality of needle rollers respectively disposed on the inside diameter side of the outer race. The outer race is formed with an inwardly facing flange portion on the inner peripheral surface of the end portion thereof.

An operation to transmit a rotation force between an input side disk and an output side disk as well as an operation to change a change gear ratio between these two disks in the above-structured toroidal-type continuously variable transmission according to the invention are similar to those in the previously described conventional toroidal-type continuously variable transmissions.

Especially, in the toroidal-type continuously variable transmission according to the invention, the sufficient load capacities of the radial needle roller bearings used to support pivot shafts provided on the two end faces of the respective trunnions inside the circular holes formed in the respective support plates can be secured, the assembling operation of the toroidal-type continuously variable transmission can be facilitated, and the members adjoining the radial needle roller bearings of the toroidal-type continuously variable transmission can be prevented against wear.

In addition, as the radial needle roller bearing, there is used a needle roller bearing of a full complement needle roller bearing which consists of only needle rollers and has no retainer. Therefore, the number of needle rollers can be increased to thereby secure the sufficient load capacities of the radial needle roller bearings without increasing the diameters of the radial needle roller bearings.

Also, in a state in which a plurality of needle rollers forming the radial needle roller bearing are disposed on the inside diameter side of an outer race, the two end faces of the respective needle rollers in the axial direction thereof are contacted with or are adjacently opposed to flange portions formed on the inner peripheral surfaces of the two end portions of the outer race. Therefore, in a state in which the needle rollers are disposed on the inside diameter side of the outer race, the needle rollers and outer race can be fitted around the pivot shaft. This can facilitate the assembling of the radial needle roller bearing to the pivot shaft.

Further, the axial-direction two end faces of each of the needle rollers are disposed opposed to the flange portions which, similarly to such needle rollers, are formed of hard material. This can prevent the members adjoining the needle roller bearings against excessive wear.

Moreover, in the toroidal-type continuously variable transmission according to the invention, it is possible to facilitate the finishing operation of an outer race raceway which is formed in the inner peripheral surface of an outer race constituting the radial needle roller bearing. Also, the axial-direction dimension of the radial needle roller bearing can be shortened, thereby being able to facilitate the drafting of a design which not only can reduce the size and weight of the whole toroidal-type continuously variable transmission but also can secure the rigidity of the trunnions of the toroidal-type continuously variable transmission.

BRIEF DESCRIPTION OF THE DRAWINGS

FIG. 9A is a schematic section view of an outer race and a grindstone according to the first embodiment; and, FIG. 9B is a schematic section view of an outer race and a grindstone according to the second embodiment;

FIG. 10A is a schematic section view of the grindstone and outer race raceway according to the first embodiment; and, FIG. 10B is a schematic section view of the grindstone and outer race raceway according to the second embodiment;

FIG. 11A is a schematic section view of the grindstone and outer race raceway according to the first embodiment; and, FIG. 11B is a schematic section view of the grindstone and outer race raceway according to the second embodiment;

DETAILED DESCRIPTION OF THE PREFERRED EMBODIMENTS OF THE INVENTION

Figure 1:
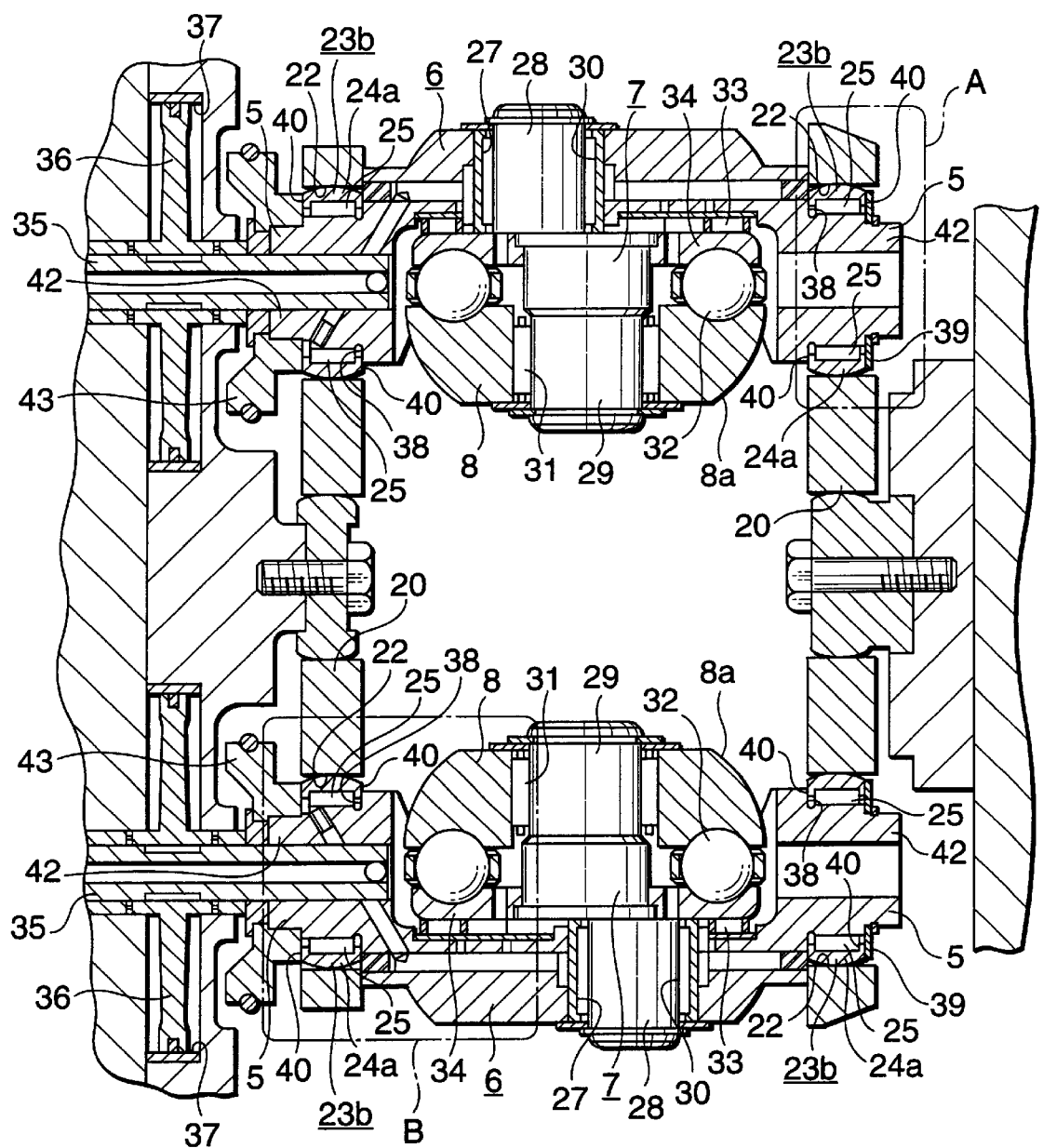
FIG. 1 is a section view of the main portions of a first embodiment of a toroidal-type continuously variable transmission according to the invention, when viewed from the same direction as in FIG. 16.
Figure 2:
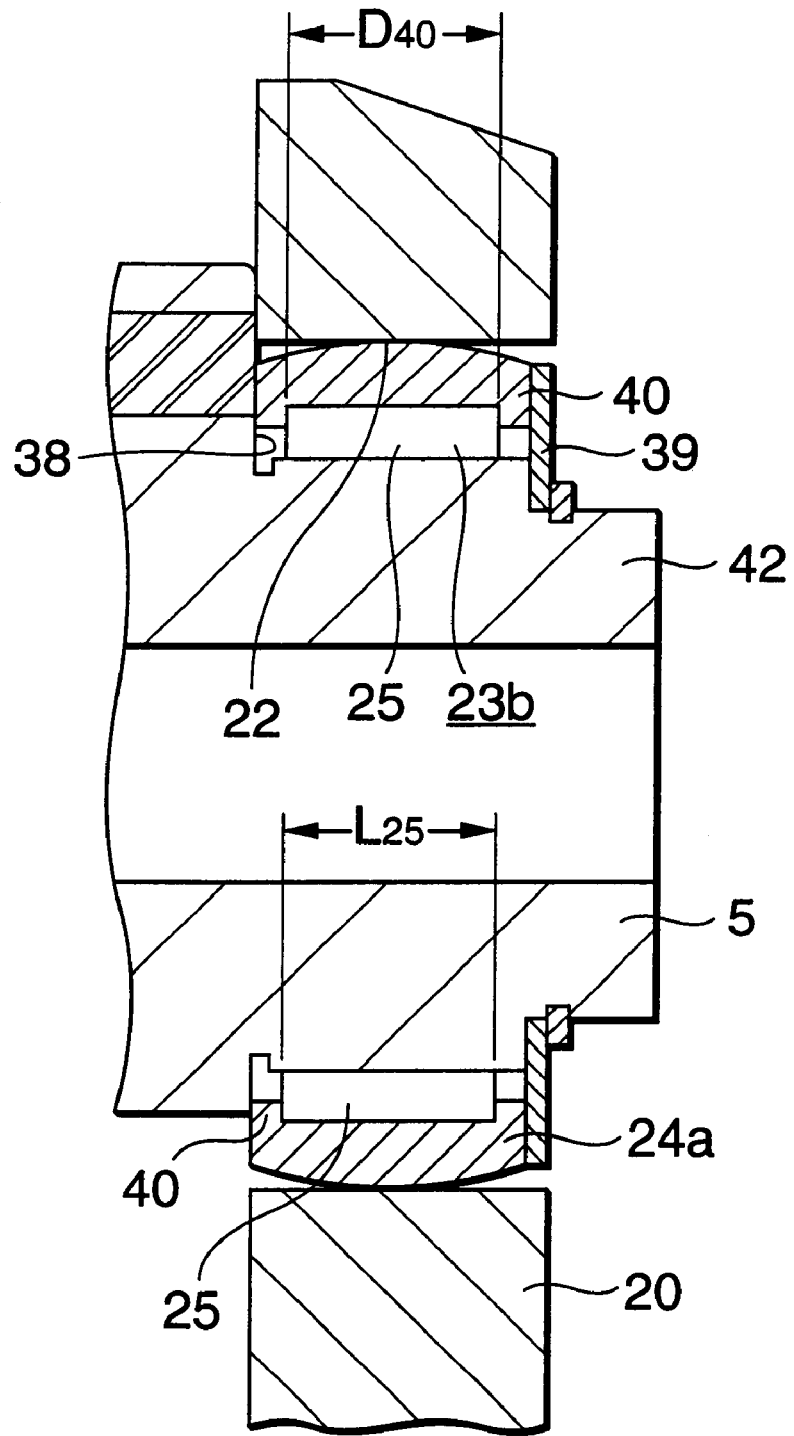
FIG. 2 is an enlarged section view of an A portion shown in FIG. 1.

Now, FIGS. 1 to 4 respectively show a first embodiment of a toroidal-type continuously variable transmission according to the invention. By the way, the feature of the invention is the structure of radial needle roller bearings 23b, 23b portions respectively used to support the pivot shafts 5, 5, which are respectively formed in the two end portions of trunnions 6, 6, in the inside portions of circular holes 22, 22 formed in support plates 20, 20. The structures and operations of the other remaining portions of the invention are similar to those of various toroidal-type continuously variable transmissions which have been conventionally known or proposed. Therefore, the description thereof is omitted or simplified and thus the following description will be given mainly of the feature of the invention.

Pivot shafts 5, 5 disposed in the respective two end portions of a pair of trunnions 6, 6 are respectively supported on a pair of support plates 20, 20 in such a manner that they can be swung and can be freely shifted in the axial direction thereof (in FIG. 1, in the right and left direction). And, the pivot shafts 5, 5 disposed in the respective two end portions of the two trunnions 6, 6 are respectively supported in the inside portions of circular holes 22, 22 formed in the mutually matched portions of the two support plates 20, 20 by radial needle roller bearings 23b, 23b, which provide a feature of the invention, in such a manner that the pivot shafts 5, 5 can be swung as well as can be freely shifted in the axial direction thereof (in FIGS. 1 to 4, in the right and left direction). Each of the radial needle roller bearings 23b, 23b is composed of an outer race 24a and a plurality of needle rollers 25, 25. Of them, the outer race 24a is structured such that its outer peripheral surface is formed as a spherically convex-shaped surface and its inner peripheral surface is formed as a cylindrical-surface-shaped outer race raceway. The center of the curvature of the spherically convex surface forming the outer peripheral surface of the outer race 24a is present on the center axis of the outer race 24a.

The radial needle roller bearings 23b, 23b, which are used to form a toroidal-type continuously variable transmission according to the invention, are needle roller bearings of a full complement needle roller bearing in which no retainer is included. Also, the outer race 24a includes two inwardly facing flange portions 40, 40 respectively formed in the inner peripheral surfaces of the two end portions thereof. A distance $D_{40}$ between the two flange portions 40, 40 is set slightly larger than the length $L_{25}$ of each, of the needle rollers 25, 25 in the axial direction thereof ($D_{40} > L_{25}$). Therefore, the needle rollers 25, 25 are freely rollably interposed between the mutually inside surfaces of the flange portions 40, 40.

Also, in the illustrated embodiment, the outer races 24a, which are used to form the radial needle roller bearings 23b, 23b, are respectively held between stepped portions 38, 38 formed on the outer peripheral surfaces of the end portions of the trunnions 6, 6 and in the base end portions of the pivot shafts 5, 5, and annular hold rings 39, 39 secured to the leading end portions of the pivot shafts 5, 5 or pulleys 43, 43 fitted around and fixed to the leading end portions of the pivots 5, 5. By the way, distances between the stepped portions 38, 38 and the hold rings 39, 39 or pulleys 43, 43 are respectively set slightly larger than the respective lengths of the outer races 24a, 24a in the axial-direction thereof. Therefore, there is no possibility that the axial-direction two end faces of the outer races 24a, 24a can rub against the stepped portions 38, 38 and hold rings 39, 39, so that the pivot shafts 5, 5 can respectively be swung and shifted smoothly inside the outer races 24a, 24a.

As described above, in the above-structured toroidal-type continuously variable transmission according to the invention, the load capacities of the radial needle roller bearings 23b, 23b used to support the pivot shafts 5, 5 respectively provided in the two end portions of the trunnions 6, 6 in the inside portions of the circular holes 22, 22 respectively formed in the support plates 20, 20 can be secured; the assembling operation of the respective radial needle roller bearings 23b, 23b to the pivot shafts 5, 5 can be facilitated; and, wear of the members adjoining the radial needle roller bearings 23b, 23b can be prevented.

Specifically, at first, since needle roller bearings of a full complement needle roller bearing having no retainer are used as the radial needle roller bearings 23b, 23b, by increasing the number of needle rollers 25, 25, the load capacities of the radial needle roller bearings 23b, 23b can be secured without increasing the diameters of the radial needle roller bearings 23b, 23b (or reducing the diameters of the needle rollers 25, 25). And, due to such positive securing of the load capacities of the radial needle roller bearings 23b, 23b, even in case where a toroidal-type continuously variable transmission according to the invention is used as a transmission for a car with an engine having a large output (especially, torque) on board, the rolling fatigue lives of the components of the radial needle roller bearings 23b, 23b can be secured, which makes it possible to enhance the reliability and durability of the present toroidal-type continuously variable transmission.

Also, in a state where a plurality of needle rollers 25, 25 forming the respective radial needle roller bearings 23b, 23b are disposed on the inside diameter sides of the outer races 24a, the two end faces of the respective needle rollers 25, 25 in the axial direction thereof are contacted with or adjacently opposed to the flange portions 40, 40 formed in the inner peripheral surfaces of the two end portions of the outer races 24a. Therefore, with the needle rollers 25, 25 disposed on the inside diameter sides of the outer races 24a, the needle rollers 25, 25 and outer races 24a can be respectively fitted around the pivot shafts 5.

Figure 3:
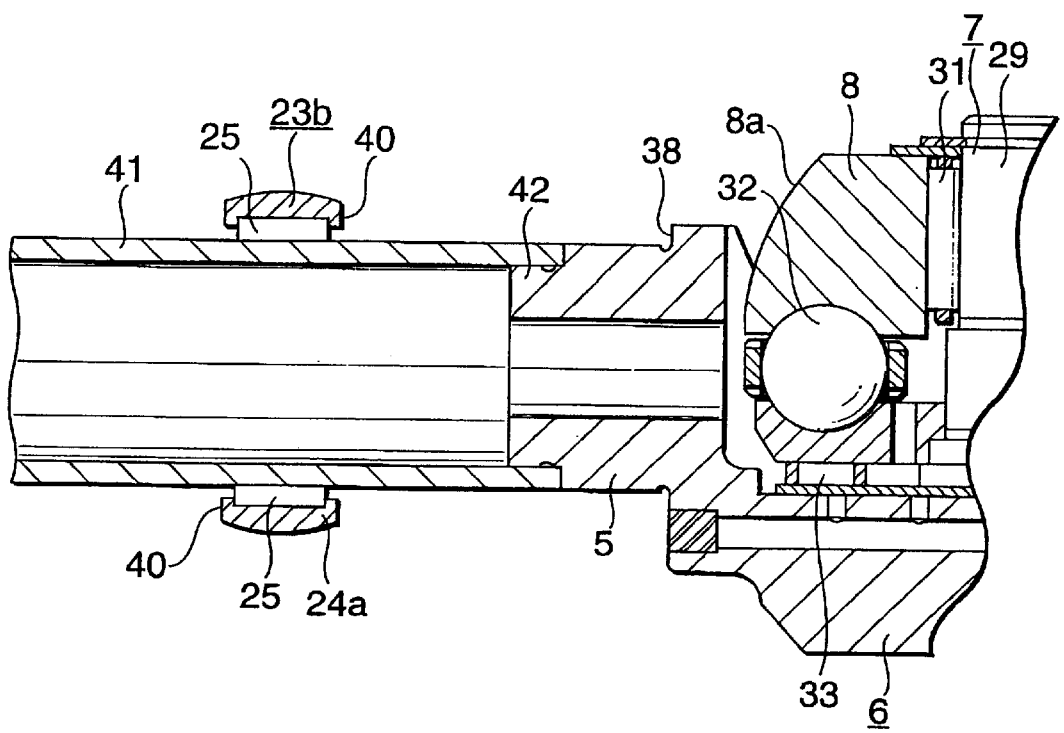
FIG. 3 is a section view of a B portion shown in FIG. 1, showing a state in which a radial needle roller bearing is assembled onto a pivot shaft.
Figure 4:
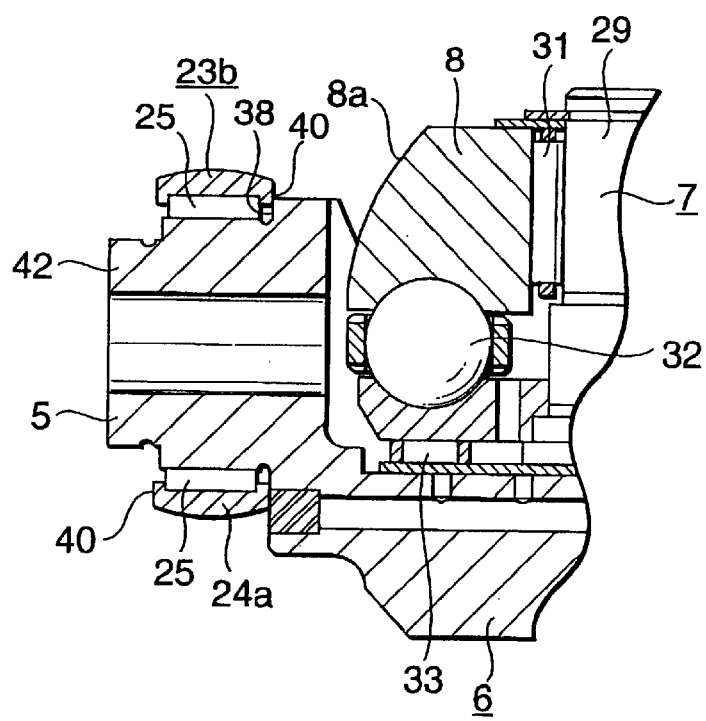
FIG. 4 is a section view of the B portion shown in FIG. 1, showing a state in which the assembling of the radial needle roller bearing onto the pivot shaft is completed.

That is, previously, the plurality of needle rollers 25, 25 are disposed closely on the inside diameter side of the outer race 24a, and then the radial needle roller bearing 23b is assembled; and, two or more sets of thus assembled radial needle roller bearings 23b are respectively fitted around a guide tube 41 in such a manner as shown in FIG. 3. Here, the outside diameter of the guide tube 41 is almost the same as the outside diameter of the pivot shaft 5. And, with the guide tube 41 fitted around a small-diameter portion 42 formed in the leading end portion of the pivot shaft 5, the radial needle roller bearings 23b are slided to the pivot shaft 5 and, as shown in FIG. 4, the radial needle roller bearings 23b are fitted one by one around the pivot shaft 5 to thereby assemble them to the periphery of the pivot shaft 5. After completion of the assembling operation of the radial needle roller bearings 23b executed in this manner, the guide tube 41 is removed from the pivot shaft 5. That is, since the assembling operation of the radial needle roller bearings 23b to the pivot shaft 5 is carried out in this manner, the assembling operation can be facilitated.

Figure 5A:
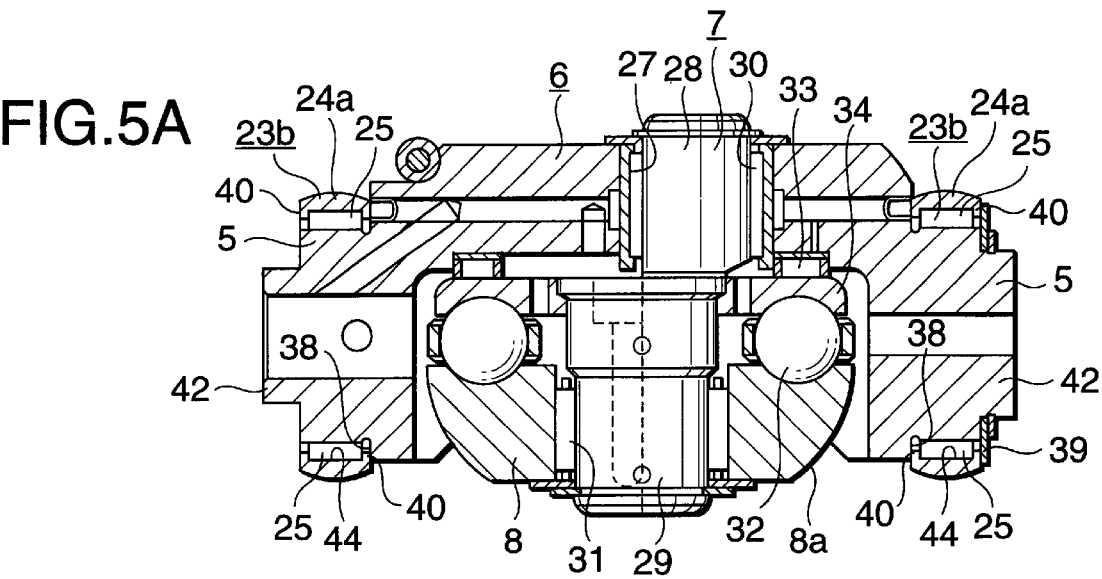
FIGS. 5A to 5C are section views of two kinds of structures of a second embodiment of a toroidal-type continuously variable transmission according to the invention, together with the structure of the first embodiment.
Figure 5B:
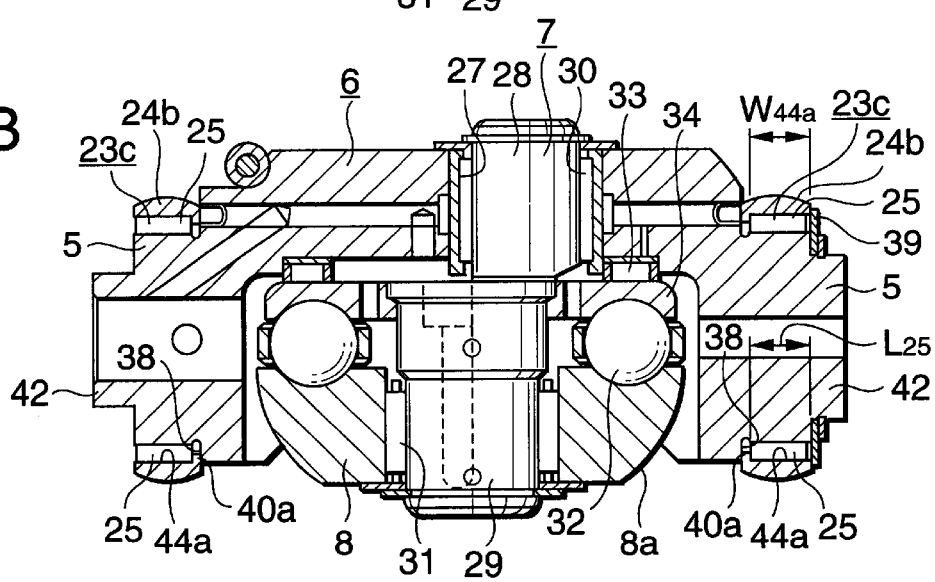
Figure 5C:
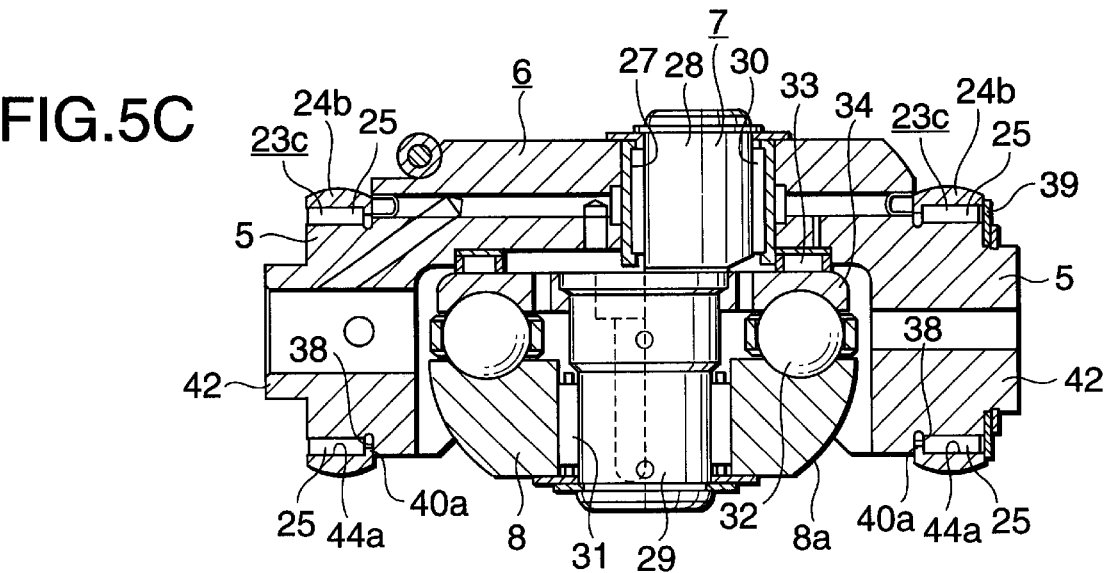
Figure 6A:
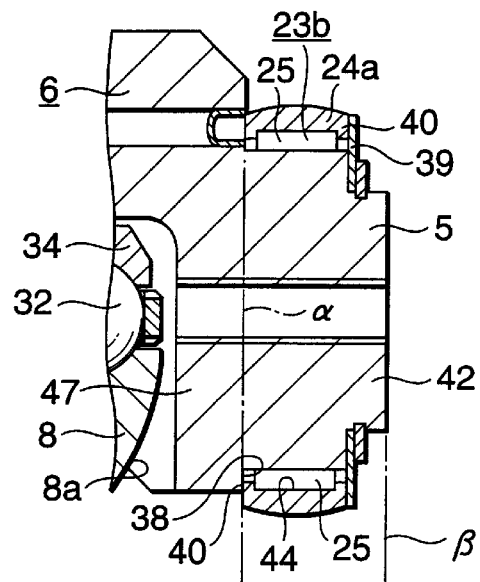
FIGS. 6A to 6C are enlarged section views of the right end portions of the structures shown in FIGS. 5A to 5C.
Figure 6B:
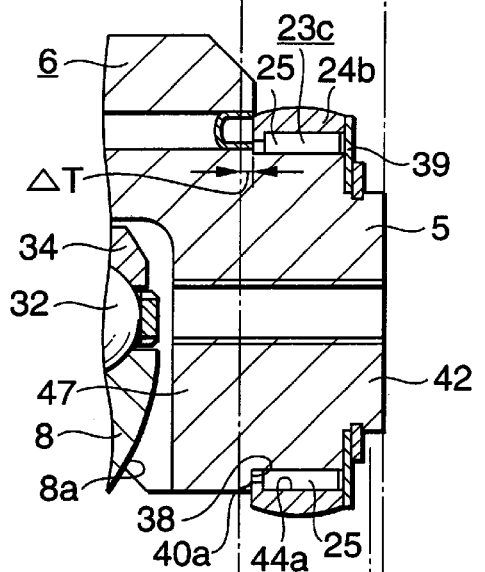
Figure 6C:
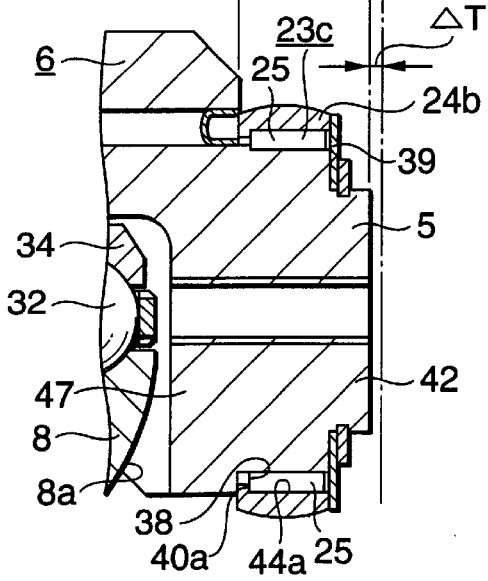
Figure 16:
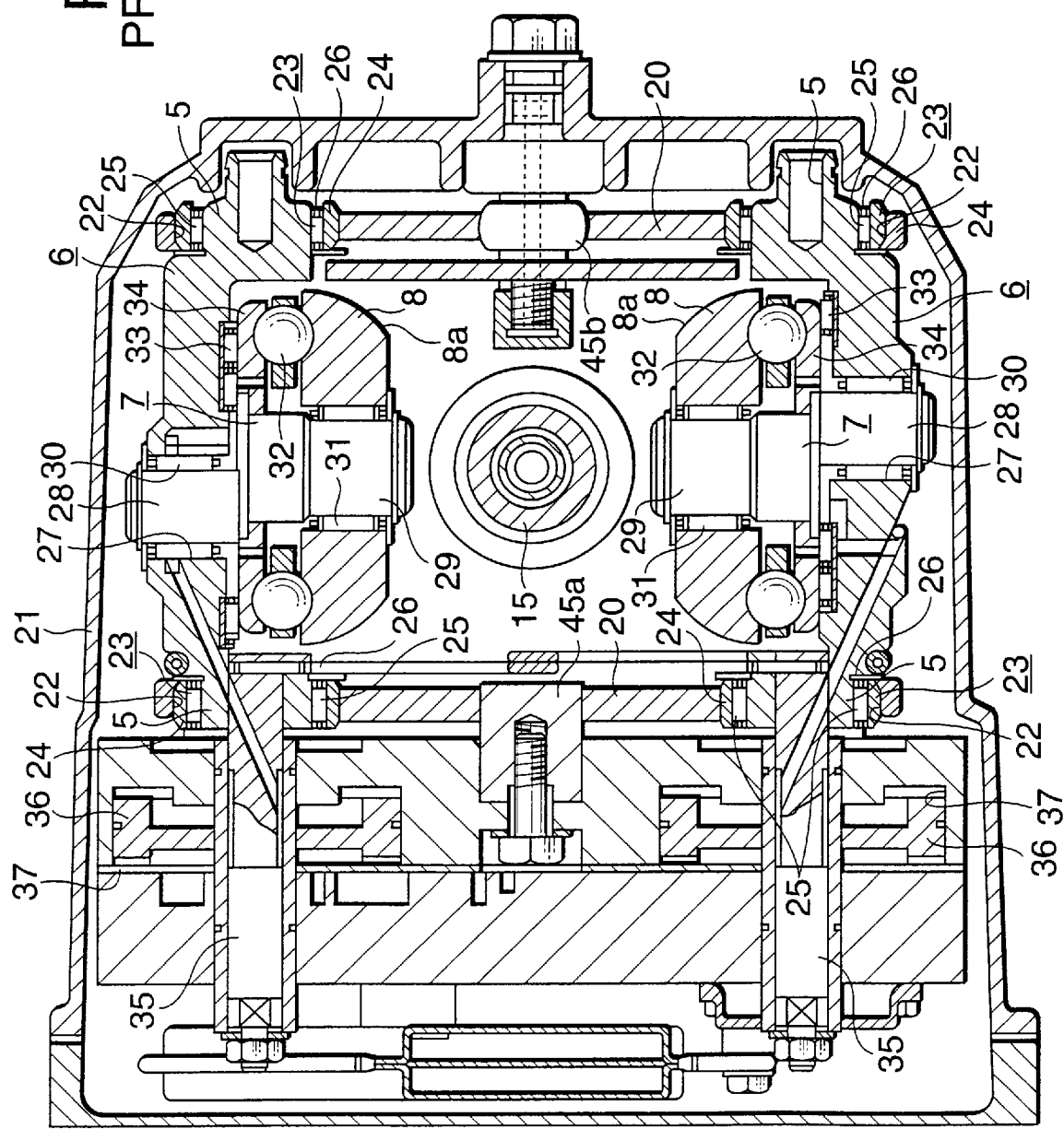
FIG. 16 is a section view taken along the line XVI–XVI shown in FIG. 15.
Figure 17:
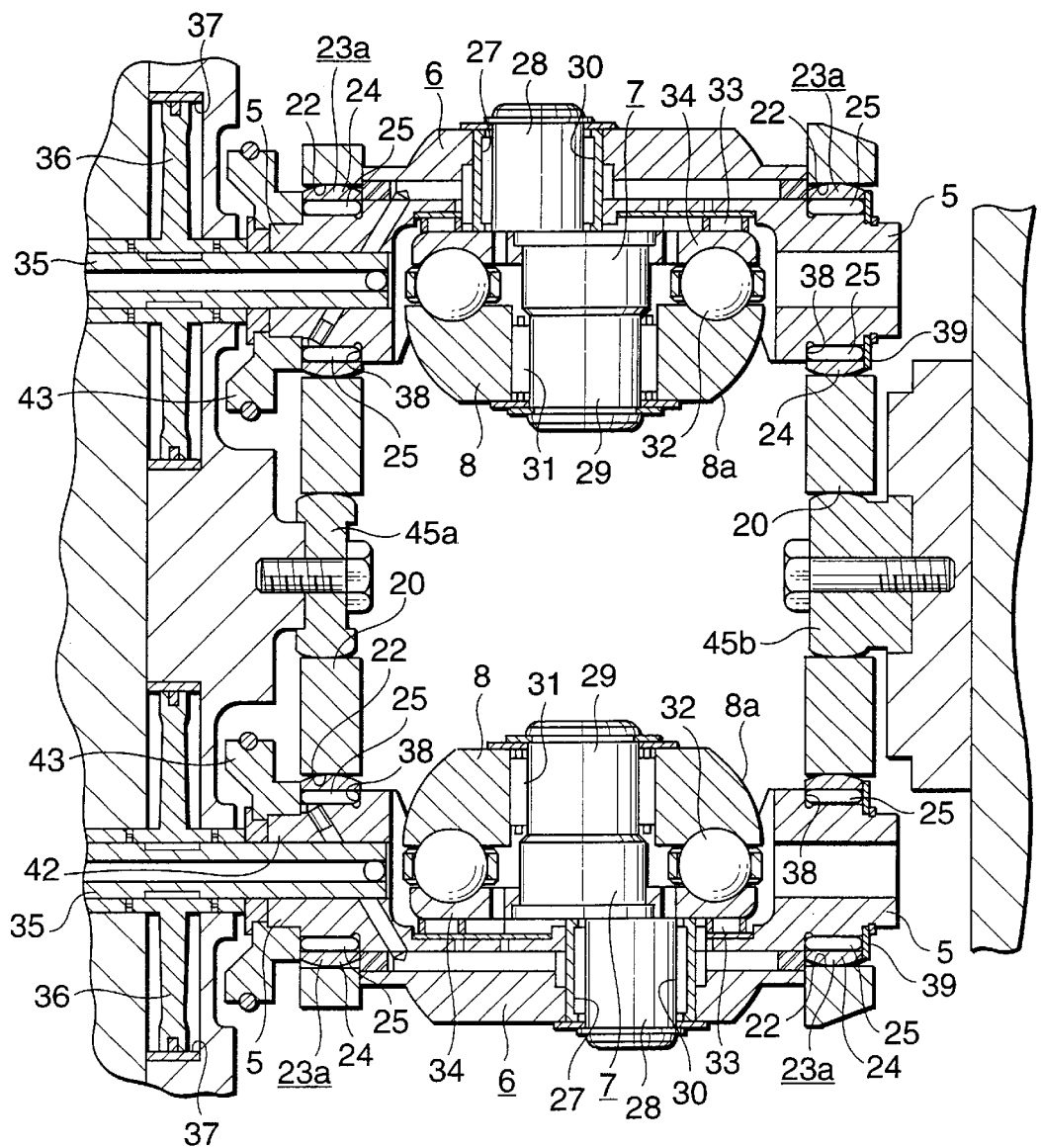
FIG. 17 is a section view of the main portions of a second example of the concrete structure of the conventional toroidal-type continuously variable transmission, when it is viewed from the same direction as in FIG. 12.

Now, FIGS. 5A–5C and 6A–6C show the structure of a second embodiment of a toroidal-type continuously variable transmission according to the invention in such a manner that it is compared with the first embodiment of the invention. In these figures, FIG. 5A shows the structure of the first embodiment of the invention; FIG. 5B shows a first example of the second embodiment of the invention in which the rigidity of the trunnion 6 is enhanced; and, FIG. 5C shows a second example of the second embodiment of the invention which aims at reducing the size and weight of the trunnion 6. Also, FIGS. 5A to 5C as well as FIGS. 6A to 6C are respectively drawn in such a manner that their respective power rollers 8 are coincident in position with each other. The feature of the present embodiment is the radial needle roller bearing 23c portion thereof used to support a pair of pivot shafts 5, 5, which are disposed concentrically with each other in the two end portions of the trunnion 6, on a pair of support plate 20, 20 (see FIGS. 1, 16 and 17) disposed slightly shiftable within a housing 21 in such a manner that the pivot shaft 5, 5 can be freely rotated as well s swung and shifted. The structures and operations of the other remaining portions of the present embodiment are similar to those of the conventional structure or the structure of the first embodiment both of which have been described before. Therefore, the description of the equivalent portions is omitted or simplified and thus the following description will be given mainly of the feature of the present embodiment.

Now, FIGS. 5 and 6 shows the structure of a second embodiment of a toroidal-type continuously variable transmission according to the invention in such a manner that it is compared with the first embodiment of the invention. In these figures, FIG. 5A shows the structure of the first embodiment of the invention; FIG. 5B shows a first example of the second embodiment of the invention in which the rigidity of the trunnion 6 is enhanced; and, FIG. 5C shows a second example of the second embodiment of the invention which aims at reducing the size and weight of the trunnion 6. Also, FIGS. 5A to 5C as well as FIGS. 6A to 6C are respectively drawn in such a manner that their respective power rollers 8 are coincident in position with each other. The feature of the present embodiment is the radial needle roller bearing 23c portion thereof used to support a pair of pivot shafts 5, 5, which are disposed concentrically with each other in the two end portions of the trunnion 6, on a pair of support plate 20, 20 (see FIGS. 1, 16 and 17) disposed slightly shiftable within a housing 21 in such a manner that the pivot shaft 5, 5 can be freely rotated as well as swung and shifted. The structures and operations of the other remaining portions of the present embodiment are similar to those of the conventional structure or the structure of the first embodiment both of which have been described before. Therefore, the description of the equivalent portions is omitted or simplified and thus the following description will be given mainly of the feature of the present embodiment.

In structures respectively shown in all of FIGS. 5A to 6C, the pivots 5, 5 disposed in the two end portions of the trunnion 6 are respectively supported on the pair of support plates 20, 20 in such a manner that they can be freely swung and shifted in the axial direction (in FIGS. 5 and 6, in the right and left direction). In more particular, the pivots 5, 5 disposed in the two end portions of the trunnion 6 are respectively supported in the inside portions of the circular holes 22, 22 (see FIG. 1 and FIGS. 16 and 17) formed in the mutually matched portions of the two support plated 20, 20 by the radial needle roller bearings 23b, 23c in such a manner that the pivots 5, 5 can be freely swung and shifted in the axial direction (in FIGS. 5 and 6, in the right and left direction). The radial needle roller bearings 23b, 23c are respectively composed of an outer race 24a, 24b and a plurality of needle rollers 25, 25. Of them, the outer races 24a, 24b are structured such that its outer peripheral surface is formed as spherically convex surface and its inner peripheral surface is formed as a cylindrical-surface-shaped outer race raceway 44, 44a. The center of the curvature of the spherically convex surface forming the outer peripheral surface of the outer race exists on the center axis of the outer race 24a, 24b.

The radial needle roller bearings 23b, 23c are respectively needle roller bearings of a full complement needle roller bearing having no retainer. In the case of the radial needle roller bearings 23b, 23b respectively forming the toroidal-type continuously variable transmission according to the first embodiment, as shown in FIGS. 5A and 6A, in the respective inner peripheral surfaces of the two end portions of the outer race 24a, there are formed the inwardly facing flange portions 40, 40. On the other hand, in the case of the radial needle roller bearings 23c, 23c respectively forming a toroidal-type continuously variable transmission according to the second embodiment, as shown in FIGS. 5B and 5C as well as 6B and 6C, only in the inner peripheral surface of one end portion of each of the outer races 24b, 24b, there is formed an inwardly facing flange portion 40a. And, the flange portion 40a is disposed opposed to the end face of the trunnion 6. The width $W_{44a}$ of the portion that forms the outer race raceway 44a between the inside surface of the flange portion 40a and the other end face of the outer race 24b is set slightly larger than the length $L_{25}$ of the respective needle rollers 25, 25 in the axial direction thereof ($W_{44a} > L_{25}$). Therefore, the needle rollers 25, 25 are disposed on the inside diameter side of the outer race 44a in such a manner that they are free to roll.

Also, in the illustrated embodiment, the outer races 24b, which constitute the radial needle roller bearings 23c, 23c, are held between the stepped portions 38, 38 formed on the outer peripheral surface of the end portion of the trunnion 6 and in the respective base end portions of the pivot shafts 5, 5 and the annular hold ring 39, 39 secured to the respective leading end portions of the pivot shafts 5, 5 or the pulleys 43, 43 (see FIG. 1 as well as FIGS. 16 and 17) respectively fitted around and fixed to the leading end portions of the pivots 5, 5. By the way, the distance between the stepped portions 38, 38 and hold rings 39, 39 or pulleys 43, 43 is set slightly larger than the length of the outer races 24b, 24b in the axial direction thereof. Therefore, the swinging motion and shifting motion of the outer races 24b, 24b within the circular holes 22, 22 can be achieved smoothly.

As described above, in the above-structured toroidal-type continuously variable transmission according to the present embodiment, the load capacities of the radial needle roller bearings 23c, 23c used to support the pivot shafts 5, 5 respectively provided in the two end portions of the trunnions 6, 6 in the inside portions of the circular holes 22, 22 respectively formed in the support plates 20, 20 can be secured; and, the assembling operation of the respective radial needle roller bearings 23c, 23c to the pivot shafts 5, 5 can be facilitated. Also, it is possible to prevent the end faces of the plurality of needle rollers 25, 25 forming the radial needle roller bearings 23c, 23c from rubbing against the stepped portions 38, 38 which are the end faces of the trunnions 6, 6. This prevents formation of recesses in the stepped portions 38, 38 of the trunnions 6, 6 due to the wear of the stepped portions 38, 38, thereby being able to secure the durability of the trunnions 6, 6.

Further, the present toroidal-type continuously variable transmission is able to facilitate the finishing operation of the outer race raceways 44a formed on the inner peripheral surfaces of the respective outer races 24b, 24b which constitute the radial needle roller bearings 23c, 23c. Also, when compared with the toroidal-type continuously variable transmission according to the first embodiment of the invention, the dimensions of the radial needle roller bearings 23c, 23c in the axial direction thereof can be shortened, which not only can reduce the size and weight of the whole of the toroidal-type continuously variable transmission but also can secure the rigidity of the trunnions 6, 6.

Specifically, at first, since the needle roller bearings of a full complement needle roller bearing having no retainer are used as the radial needle roller bearings 23c, 23c, by increasing the number of needle rollers 25, 25, the load capacities of the radial needle roller bearings 23c, 23c can be secured without increasing the diameters of the radial needle roller bearings 23c, 23c (or reducing the diameters of the needle rollers 25, 25). And, due to such positive securing of the load capacities of the radial needle roller bearings 23c, 23c, even in case where a toroidal-type continuously variable transmission according to the present embodiment is used as a transmission for a car with an engine having a large output (especially, torque) on board, the rolling fatigue lives of the components of the radial needle roller bearings 23c, 23c can be secured, which makes it possible to enhance the reliability and durability of the present toroidal-type continuously variable transmission.

Also, in a state where a plurality of needle rollers 25, 25 forming the respective radial needle roller bearings 23c, 23c are disposed on the inside diameter sides of the outer races 24b, the one end faces of the respective needle rollers 25, 25 in the axial direction thereof are contacted with or adjacently opposed to the flange portions 40a formed in the inner peripheral surfaces of the one end portions of the outer races 24b. Therefore, in case where the needle rollers 25, 25 can be prevented from removing from openings formed in the other end portions of the outer races 24b, with the needle rollers 25 disposed on the inside diameter sides of the outer races 24b, the needle rollers 25, 25 and outer races 24b can be respectively fitted around the pivot shafts 5.

Figure 7:
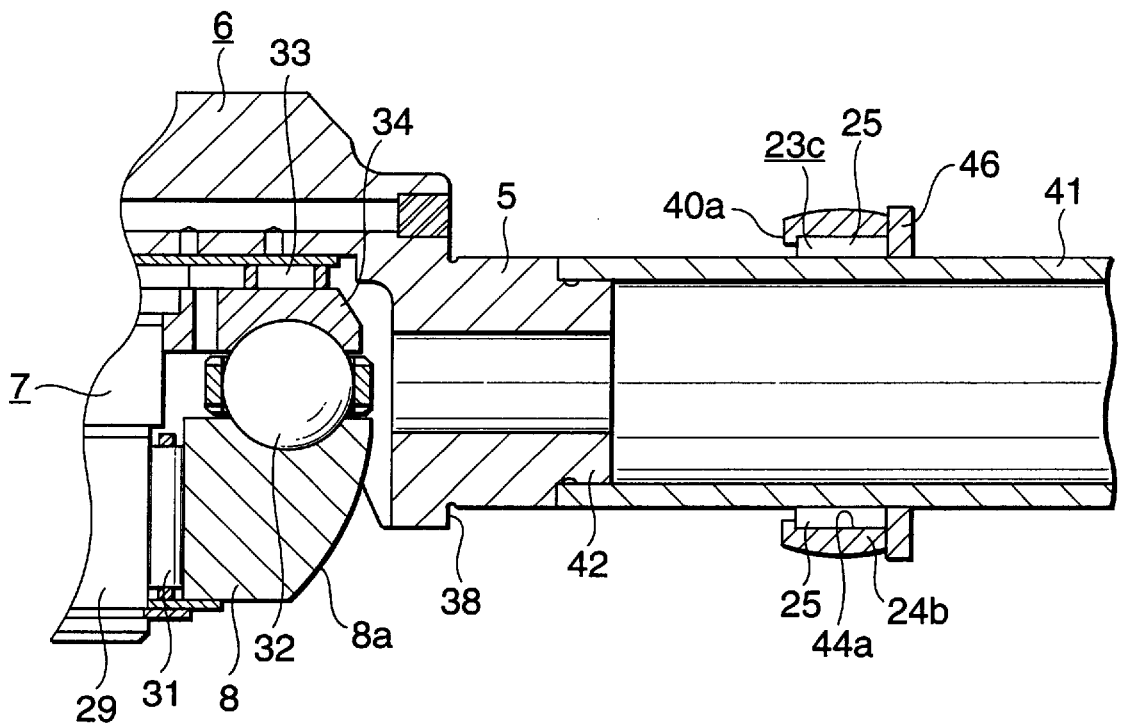
FIG. 7 is a section view of the right portions shown in FIGS. 5B and 5C, showing a state in which a radial needle roller bearing is assembled onto a pivot shaft.

That is, similarly to the previously described first embodiment, previously, the plurality of needle rollers 25, 25 are disposed closely on the inside diameter side of the outer race 24b, and then the radial needle roller bearing 23c is assembled; and, one or more sets of thus assembled radial needle roller bearings 23c are respectively fitted around a guide tube 41 as shown in FIG. 7. Also, together with the radial needle roller bearing 23c, an annular hold member 46 is also previously fitted around the guide tube 41. This hold member 46 is disposed opposed to, of the two end faces of the outer race 24b which forms the present radial needle roller bearing 23c, the other end side of the outer race 24b where the flange portion 40a is not formed, whereby not only the needle rollers 25, 25 can be prevented from removing from the openings in the other end side of the outer race 24b but also the outer race 24b can be pushed and moved. By the way, when fitting two or more sets of radial needle roller bearings 23c around the guide tube 41, the hold member 46 may be provided only the other end side of the radial needle roller bearing 23c that is situated on the nearest side (in FIG. 7, on the right side) in the pushing and moving direction (in FIG. 7, in the left direction).

Figure 8:
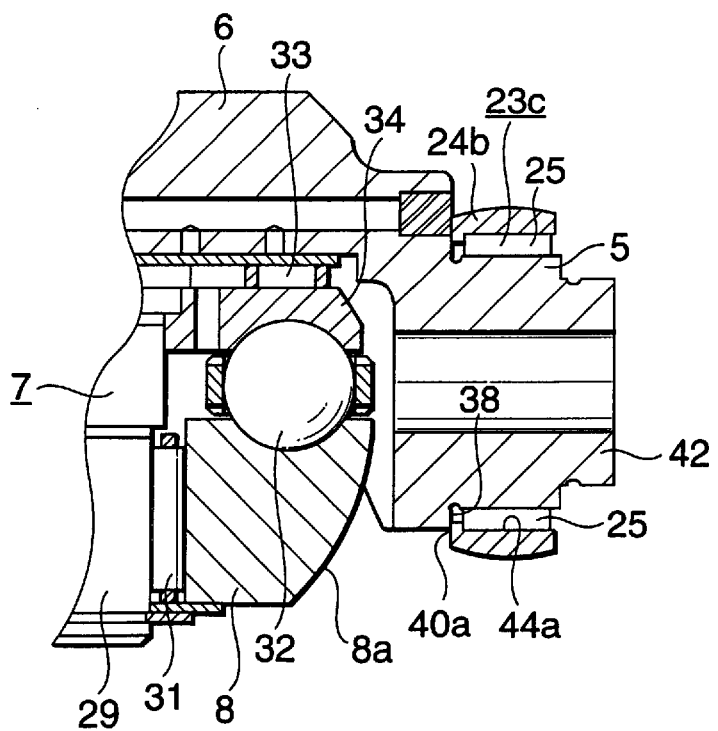
FIG. 8 is a section view of the right portions shown in FIGS. 5B and 5C, showing a state in which the assembling of the radial needle roller bearing onto the pivot shaft is completed.

The outside diameter of the guide tube 41 is almost the same as the outside diameter of the pivot shaft 5. And, in a state where this guide tube 41 is fitted around a small diameter portion 42 formed in the leading end portion of the pivot shaft 5, while pushing the radial needle roller bearing 23c by the hold member 46, the radial needle roller bearing 23c is slided toward the pivot shaft 5; that is, the radial needle roller bearings 23c are fitted one by one around the pivot shaft 5 and thus are assembled onto the periphery of the pivot shaft 5, as shown in FIG. 8. After completion of the assembling operation to be executed in this manner, the guide tube 41 is removed from the pivot shaft 5. Since the assembling operation of the radial needle roller bearings 23c onto the pivot shaft 5 is carried out in this manner, the present assembling operation can be facilitated.

Also, in the present embodiment, of the respective axial-direction two end faces of the needle rollers 25, 25 constituting the radial needle roller bearing 23c, one end face is disposed opposed to the flange portion 40a formed in the outer race 24b. The outer race 24b is, similarly to the needle rollers 25, 25, made of such hard material as bearing steel including high-carbon chrome bearing steel, which can prevent the inside surface of the flange portion 40a of the outer race 24b from wearing excessively. Also, even when the inside surface happens to wear, there is no possibility that a great stress can be generated in the flange portion 40a when the present toroidal-type continuously variable transmission is in operation, which eliminates the possibility that the durability of the outer race 24b can be lowered. Although the outer surface of the flange portion 40a faces the stepped portion 38, the opposing area of this portion is wide and thus, even when they are slidingly contacted with each other, a surface pressure acting on the sliding contact portion is too low to generate metallic contact on the sliding contact surface thereof, so that such wear as can raise a problem cannot be generated in the outer surface of the flange portion 40a at all.

On the other hand, the other end faces of the needle rollers 25, 25 in the axial direction thereof are disposed opposed to the side surface of the hold ring 39 or pulley 43 (see FIGS. 1 and 17) secured to the leading end portion (in FIGS. 5 and 6, the right end portion) of the pivot shaft 5. For this reason, there is a possibility that, in part of the hold ring 39 and pulley 43, there can be formed recesses due to the wear thereof. However, there is no possibility that, when the present toroidal-type continuously variable transmission is in operation, a great stress can be generated in the hold ring 39 and pulley 43. Therefore, even when there are formed some recesses in the hold ring 39 and pulley 43, there is no possibility that the durability of the whole of the present toroidal-type continuously variable transmission can be impaired.

Also, in the present embodiment, since the flange portion 40a is formed only in one end portion of each of the outer races 24b respectively constituting the radial needle roller bearings 23c, 23c, when compared with the first embodiment, a finishing operation of an outer race raceway 44a formed in the inner peripheral surface of the outer race 24b can be facilitated. A description will be given below in detail of this advantage with reference to FIGS. 9A to 12.

Figure 9A:
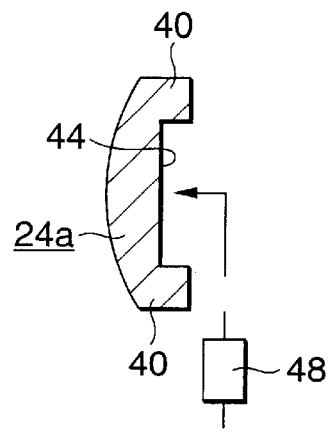
FIGS. 9A and 9B show a state in which a grindstone is moved in order to grind or finish an outer race raceway; in particular.
Figure 9B:
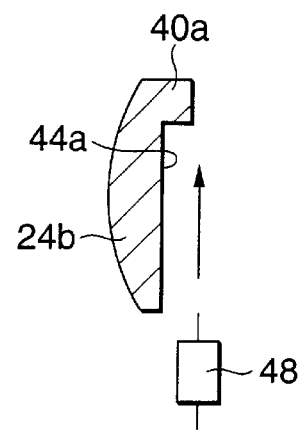

At first, as in the first embodiment, in case where the flange portions 40, 40 are present in the two end portions of the outer race 24*a*, as shown by an arrow mark in FIG. 9A, a grindstone 48, which is used to grind the outer race raceway 44, must be moved not only in the thrust direction but also in the radial direction. On the other hand, as in the present embodiment, in case where the flange portion 40*a* is formed only in one end portion of the outer race 24*b*, as shown by an arrow mark in FIG. 9B, a grindstone 48 used to grind the outer race raceway 44*a* may be moved only in the thrust direction. In this manner, to move the grindstone 48 for grinding only in one direction can shorten the time necessary to carry out the finishing operation of the outer race raceway.

Figure 10A:
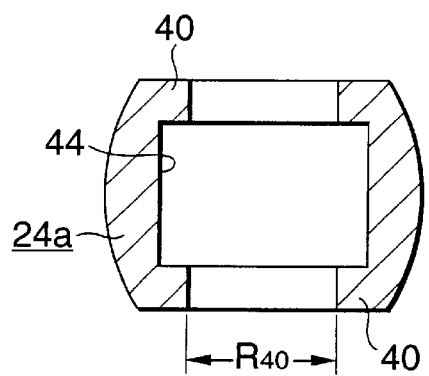
FIGS. 10A and 10B show the allowable maximum diameters of grindstones used to grind or finish outer race raceways; in particular.
Figure 10B:
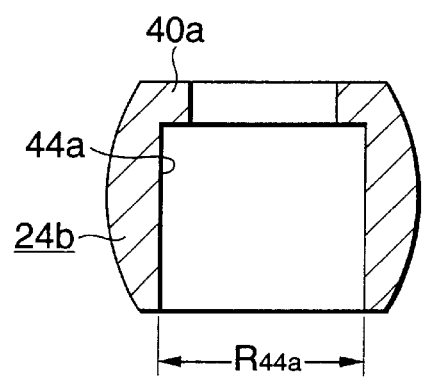

Secondly, as in the first embodiment, in case where the flange portions 40, 40 are present in the two end portions of the outer race 24*a*, as shown in FIG. 10A, there can be used only the grindstone that has an outside diameter smaller than the inside diameter dimension $R_{40}$ of the flange portion 40. On the other hand, as in the present embodiment, in case where the flange portion 40*a* is formed only in one end portion of the outer race 24*b*, as shown in FIG. 10B, it is possible to use a grindstone which has an outside diameter up to a dimension slightly smaller than the inside diameter $R_{44a}$ of the outer race raceway 44*a* to be ground or finished. In this manner, to be able to use a grindstone having a large outside diameter makes it possible not only to increase the sliding contact area between the outside diameter surface of the grindstone and the outer race raceway 44*a* accordingly but also to increase the peripheral speed of the grindstone under the same number of times of rotations to thereby increase the grinding speed. Further, this can save the time necessary to execute the finishing operation of the outer race raceway while restraining the displacement amount of the grindstone as small as possible.

Figure 11A:
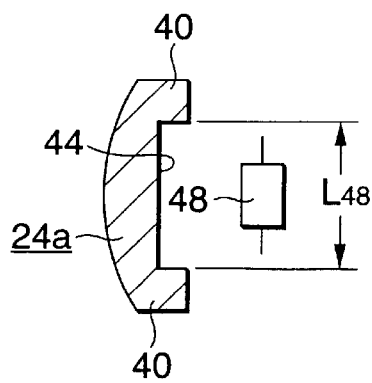
FIGS. 11A and 11B show the restricted ranges of the strokes of grindstones used to grind or finish the outer race raceways when the grindstones are moved in the axial direction thereof; in particular.
Figure 11B:
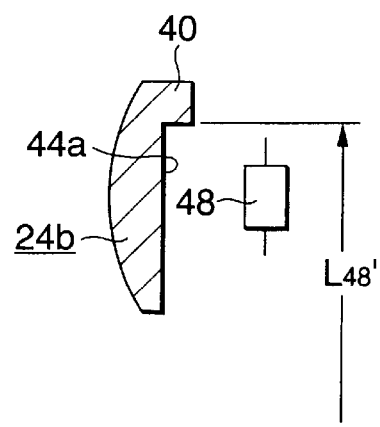
Figure 12:
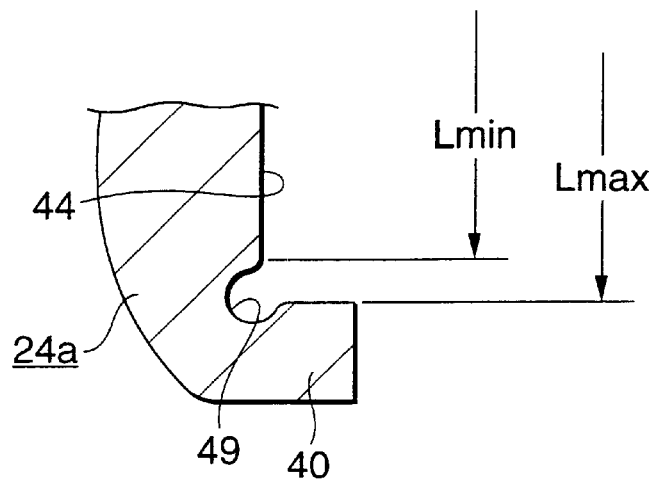
FIG. 12 is a partial section view of a recessed groove formed in the end portion of an outer race.
Figure 13:
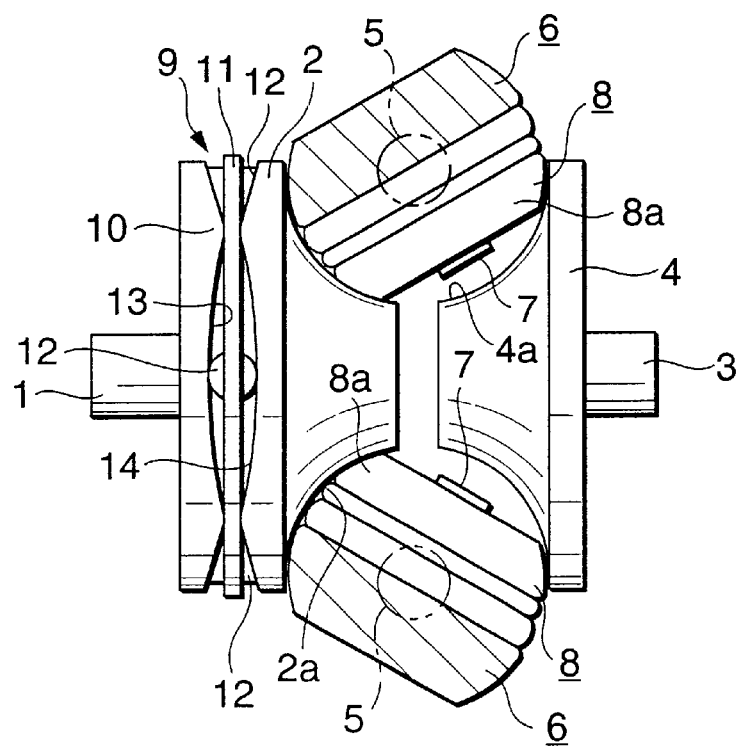
FIG. 13 is a side view of the basic structure of a conventional toroidal-type continuously variable transmission, showing the maximum decelerated state thereof.
Figure 14:
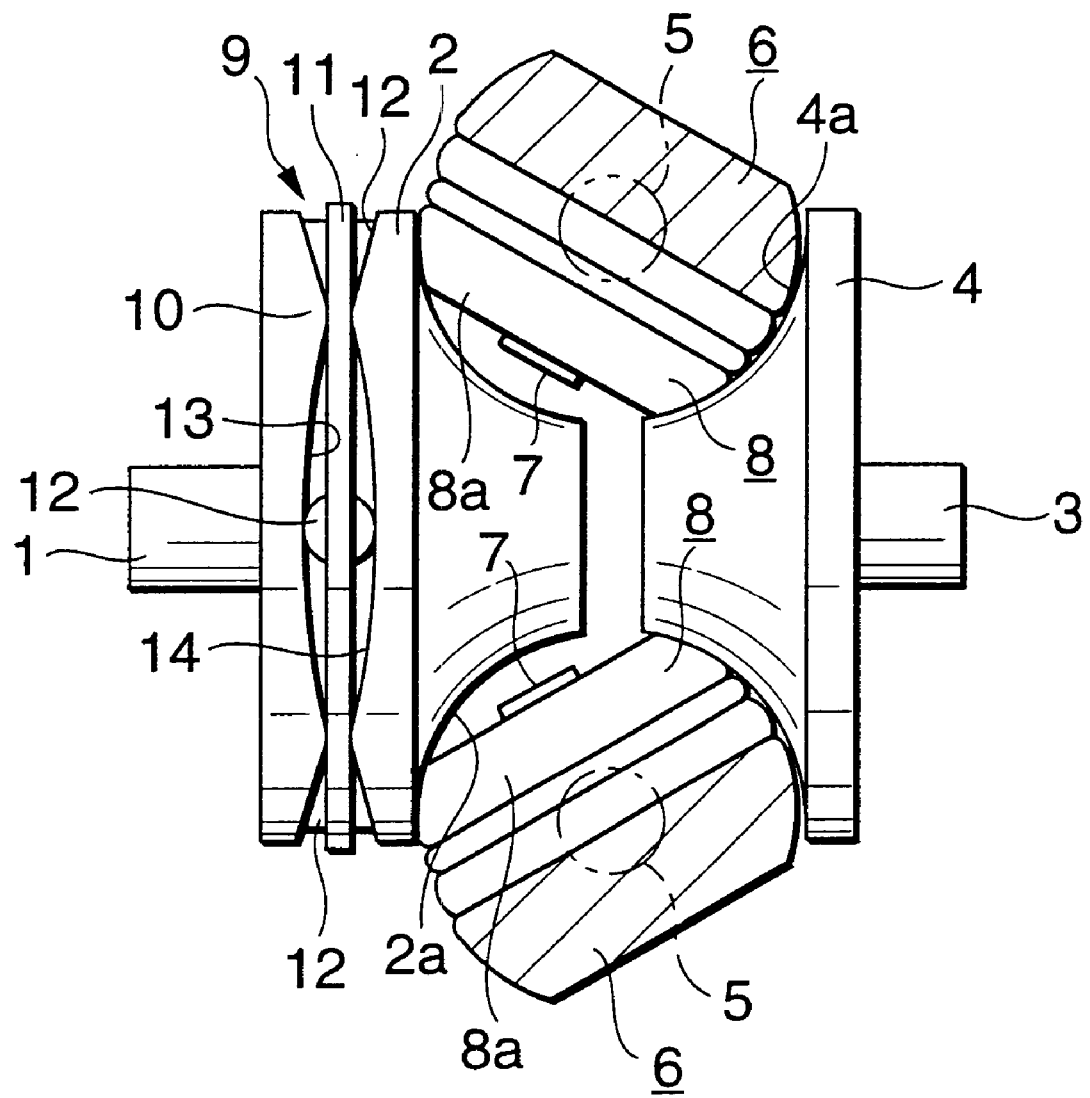
FIG. 14 is a side view of the basic structure of the conventional toroidal-type continuously variable transmission, showing the maximum accelerated state thereof.
Figure 15:
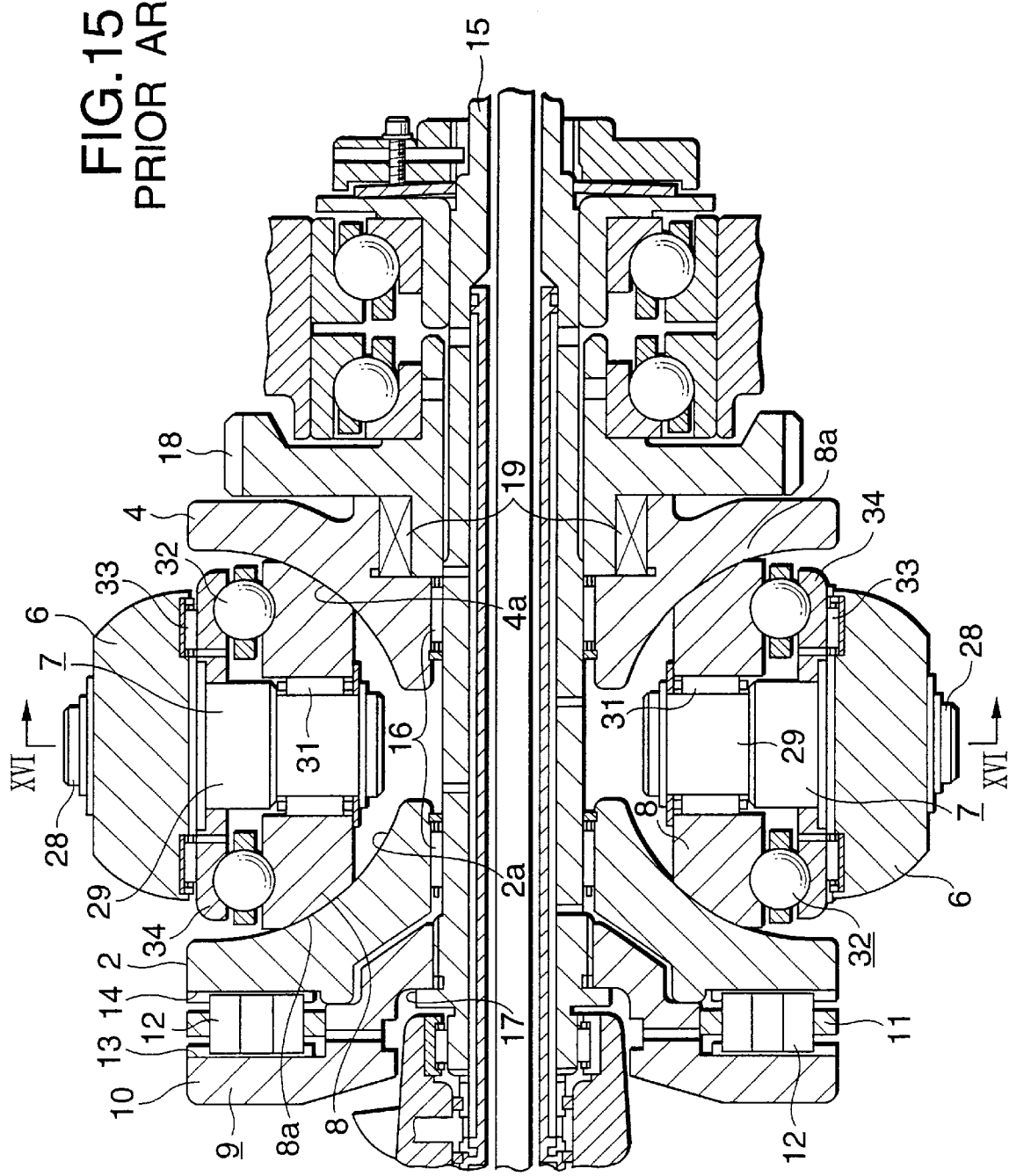
FIG. 15 is a section view of a first example of the concrete structure of a conventional toroidal-type continuously variable transmission.

Thirdly, as in the first embodiment, in case where the flange portions 40, 40 are present in the two end portions of the outer race 24*a*, as shown in FIG. 11A, it is necessary to restrict the stroke $L_{48}$ of the grindstone 48 strictly on the two end sides of the grindstone 48 in the axial direction thereof. That is, between the outer race raceway 44 to be finished and the inside surfaces of each of the two flange portions 40, 40, as shown in FIG. 12, there is formed a recessed groove 49 for escape of grinding. In the finishing operation, truly, the stroke $L_{48}$ of the grindstone 48 is able to grind the outer race raceway 44 completely; however, the stroke $L_{48}$ must be restricted in such a manner that, as shown in FIG. 12, it is larger than $L_{min}$ but smaller than $L_{max}$ (that is, $L_{min} < L_{48} < L_{max}$) so that the grindstone 48 does not contact with the inside surfaces of the flange portions 40, 40. On the other hand, as in the present embodiment, in case where the flange portion 40*a* is formed only in one end portion of the outer race 24*b*, it is not necessary to strictly restrict the stroke of the outer race 24*b* on the other end side thereof. This can facilitate the setting of a grinding apparatus accordingly, which can in turn facilitate the machining operation of the outer race 24.

Further, in the present embodiment, when compared with a toroidal-type continuously variable transmission according to the first embodiment, the dimensions of the radial needle roller bearings 23*c*, 23*c* in the axial direction thereof can be shortened, thereby being able to facilitate the drafting of a design which not only can reduce the size and weight of the whole of the toroidal-type continuously variable transmission but also can secure the rigidity of the trunnions 6. A description will be given below in detail of this aspect with reference to FIG. 6.

In case of the structure of the first embodiment shown in FIG. 6A, because the flange portions 40, 40 are respectively present in the two end portions of the outer race 24*a*, when securing the rigidity of the trunnion 6, the stepped portion 38 which is the end face of the trunnion 6 is present at the position of a chained line α shown in FIG. 6, and the end face of the pivot shaft 5 provided in the end portion of this trunnion 6 is present at the position of another chained line α shown in FIG. 6. On the other hand, in case of the structure of the present embodiment, since the flange portion 40*a* is present only in one end portion of the outer race 24*b*, in case where the load capacity of the radial needle roller bearing 23*c* is equal to the load capacity of the radial needle roller bearing 23*b* according to the first embodiment, the toroidal-type continuously variable transmission can be reduced in size and weight, or the rigidity of the trunnion 6 can be enhanced.

At first, FIG. 6B shows a case in which the rigidity of the trunnion 6 is enhanced. In this case, the position of the leading end face of the pivot shaft 5 is the same as the first embodiment shown in FIG. 6A. In the present embodiment, the thickness dimension of the side wall 47 portion of the trunnion 6, which is the end portion of the trunnion 6, when compared with the first embodiment, can be increased by an amount ΔT which is a difference between the axial-direction dimension of the outer race 24*a* used in the first embodiment and the axial-direction dimension of the outer race 24*b* used in the present embodiment. Thus, the trunnion 6 is allowed to support a larger thrust load by an amount equivalent to such difference, which makes it possible to realize a toroidal-type continuously variable transmission which is able to transmit a large torque.

Next, FIG. 6C shows a case in which the dimension of the trunnion 6 in the axial direction thereof is shorted. In this case, the position of the end face of the trunnion 6 is the same as the first embodiment shown in FIG. 6A. In the present embodiment, the position of the leading end face of the pivot shaft 5, when compared with the first embodiment, can be made to approach the center of the trunnion 6 by an amount ΔT which is a difference between the axial-direction dimension of the outer race 24*a* used in the first embodiment and the axial-direction dimension of the outer race 24*b* used in the present embodiment. Thus, the dimension of the trunnion 6 in the axial direction thereof can be shortened by an amount equivalent to such difference, which makes it possible to realize a toroidal-type continuously variable transmission which is reduced in size and weight.

By the way, the foregoing description has been given of a case in which the present invention is applied to a toroidal-type continuously variable transmission of a two-roller type in which two rollers are provided in each cavity. However, the invention is not limited to such two-roller type of toroidal-type continuously variable transmission, but it can also be applied to a toroidal-type continuously variable transmission of a three-roller type in which three rollers are provided in each cavity.

Since the present invention is structured and operated in the above-mentioned manner, not only the load capacity of the radial needle roller bearing can be increased without increasing the diameter of the radial needle roller bearing or complicating the assembling operation thereof, but also the wear of members adjoining the radial needle roller bearing can be prevented. Thanks to this, the invention is able to contribute to the realization of a toroidal-type continuously variable transmission which is compact, has excellent durability and can be manufactured at a low cost.

Also, according to the invention, a finishing operation can be facilitated and it is possible to facilitate the drafting of a design which not only can reduce the size and weight of the whole of the present toroidal-type continuously variable transmission but also can secure the rigidity of the respective trunnions that are used in the toroidal-type continuously variable transmission.

While only certain embodiments of the invention have been specifically described herein, it will apparent that numerous modifications may be made thereto without departing from the spirit and scope of the invention.

What is claimed is:

1. A toroidal-type continuously variable transmission comprising:

a housing;

input side and output side disks respectively supported within said housing in such a manner as to be concentric with each other and be rotated independently of each other, said two disks respectively including inner surfaces each formed in a concave surface having an arc-shaped section;

a pair of support plates disposed substantially in parallel to each other within said housing in such a manner as to hold said two disks from both sides thereof, said pair of support plates respectively including circular holes formed in the mutually matched portions thereof;

a plurality of trunnions being respectively swingable about a pair of mutually concentric pivot shafts, said pivot shafts being respectively disposed at torsional positions lying at right angles to the direction of the center axes of said two disks and not intersecting said center axes;

a plurality of displacement shafts respectively supported on said trunnions;

a plurality of power rollers respectively supported rotatably on said displacement shafts and held between the respective inner surfaces of said input side and output side disks, each of said power rollers having a peripheral surface formed in a spherically convex surface; and, a plurality of radial needle roller bearings respectively supporting said pivot shafts, each of said radial needle roller bearings including:

an outer race interposed between an outer peripheral surface of said pivot shaft and an inner peripheral surface of said circular hole of said support plate, said outer race having an outer peripheral surface formed in a spherically convex surface; and a plurality of needle rollers respectively disposed on the inside diameter side of said outer race, wherein said outer race is formed with an inwardly facing flange portion only on the inner peripheral surface of one end portion thereof so that the inside surface of said flange portion opposes to the respective one-end faces of said needle rollers in the axial direction thereof, and said flange portion opposes to the end faces of said trunnions.

2. A toroidal-type continuously variable transmission as set forth in claim 1, wherein said radial needle roller bearing is a needle roller bearing of a retainerless full complement needle roller bearing.

* * * * *